United States Patent [19]

Merry

[11] Patent Number: 4,513,173

[45] Date of Patent: Apr. 23, 1985

[54] INTUMESCENT FIRE PROTECTIVE SHEATHS

[75] Inventor: Richard P. Merry, White Bear Lake, Minn.

[73] Assignee: Minnesota Mining and Manufacturing Company, St. Paul, Minn.

[21] Appl. No.: 501,887

[22] Filed: Jun. 7, 1983

[51] Int. Cl.³ .................... H01B 7/34; H01B 13/06
[52] U.S. Cl. ........................... 174/121 A; 138/103; 156/54; 428/377
[58] Field of Search .............. 174/121 A; 169/48; 156/54, 213, 215; 428/377; 138/103, 119

[56] References Cited

U.S. PATENT DOCUMENTS

| | | | |
|---|---|---|---|
| 3,709,706 | 1/1973 | Sowman | 106/57 |
| 3,795,524 | 3/1974 | Sowman | 106/65 |
| 3,916,057 | 10/1974 | Hatch et al. | 428/236 |
| 4,018,983 | 4/1977 | Pedlow | 174/135 |
| 4,047,965 | 9/1977 | Karst et al. | 106/65 |
| 4,265,953 | 5/1981 | Close | 428/78 |
| 4,273,879 | 6/1981 | Langer et al. | 521/91 |
| 4,297,526 | 10/1981 | Leuchs et al. | 174/102 R |
| 4,305,992 | 12/1981 | Langer et al. | 428/324 |

OTHER PUBLICATIONS

"Kaowool Blanket Wrap Fire Protection Systems" published by Babcock & Wilcox, a McDermott Company.
"Ceramic Fiber Blanket Wrap for Fire Protection of Cable Trays and Conduits" by Charles E. Chaille and Richard J. Reiman.

*Primary Examiner*—A. T. Grimley
*Assistant Examiner*—Morris H. Nimmo
*Attorney, Agent, or Firm*—Donald M. Sell; James A. Smith; Robert W. Hoke, II

[57] ABSTRACT

Intumescent fire protective sheaths useful for the protection of electric cables and conduits from open flame damage and methods for making such sheaths. The sheath comprises sheets of substantially inorganic intumescent material capable of arrangement around the cable or the conduit to form a protective layer. The layer is restrained to expand only in the general direction of the electrical cables or conduits upon exposure to open flames. In the unexpanded state, the sheaths dissipate cable-generated heat due to their higher value of thermal conductivity, their relative thinness and their fin-like shape.

12 Claims, 5 Drawing Figures

INTUMESCENT FIRE PROTECTIVE SHEATHS

BACKGROUND

The present invention relates to substantially inorganic intumescent fire protective sheaths useful for the protection of electrical cables or conduits from open flame damage.

Industry has long sought better materials for use in cable/conduit construction to protect electrical systems against failures. Fire protection is particularly critical when power supply is necessary for maintenance of controls, for example, in aircraft and control systems in nuclear power plants. The art of heat resistant compositions is replete with numerous organic materials which can withstand moderate temperatures for limited times. Materials which are effective for electric arc and flame protection are generally polymeric materials containing flame and fire retardant components such as halogenated plasticizers and polymers, antimony oxides and organic phosphate esters and chlorides. One of the most commonly used is polyvinyl chloride which is flame retarding. However, the chloride containing materials such as polyvinyl chloride have the disadvantage that the hydrogen chloride, which is evolved on decomposition, combines with water resulting in a highly corrosive reaction with nearby metal components. U.S. Pat. No. 4,273,879 is an illustrative prior effort to provide a material that is more resistant to fire. The active material is an alkali metal silicate and char-forming resins such as phenolic resins, polycarbodiimide and melamine formaldehydes. The binder materials include char-forming polymers such as chloroprene and acrylonitrile elastomers.

Inorganic materials in the form of fiber blankets have also been used to protect electrical systems from the adverse effects of open flames. One such fiber blanket is marketed under the trademark "Kaowool" by Babcock & Wilcox. As recommended, a blanket having a thickness of at least two inches must be used to achieve adequate fire protection. It is believed such thicknesses of fiber unduly restrict the dissipation of resistive heat losses generated within the electrical cable or conduit. This results in a derating of the cable or conduit for the amount of current that can be carried.

Along with the search for better materials has been a search for better ways to apply or affix the materials to protect the electrical cables and conduits from open flame damage. For example, U.S. Pat. No. 4,018,983 discloses a fire protective material which is preshaped into sheaths, boots and the like. The protective material is essentially a chlorinated plastisol into which has been combined intumescing or heat foamable substances, heat resistant fibers such as aramide fibers, fire retardant plasticizers, organic-metallic heat stabilizers and glassy microspheres. In U.S. Pat. No. 4,297,526 a cable is insulated with a thermoplastic material and a filler comprised of a thermoplastic admixture. On exposure to fire, the polymer degradation gases are absorbed by the filler and cause the filler to expand and seal the cable to longitudinal flow of hot gases. As another example, U.S. Pat. No. 4,265,953 discloses insulating wrappings comprising a stressable substrate having intumescent material adhered to the substrate. The intumescent material is expanded after installation to tension the stressable substrate which then becomes a stressed skin which severely limits the expansion of the intumescent material. It is not believed the wrappings would provide adequate protection of an electrical cable or conduit from the heat generated by an open flame.

While many of the known materials function well for their intended purposes, they generally fail to provide the necesssary protection of electrical conduits or cables from direct exposure to fires. When exposed to the heat and flames of a fire, the intumescent materials tend to crack open when expanded in their circular form. Such open cracks expose the conduit or cable to open flame.

SUMMARY OF THE INVENTION

The intumescent sheath of the present invention overcomes the disadvantages of the prior art by providing added protection of electrical conduits or cables from direct exposure to open flames.

According to the invention, an intumescent fire protective sheath and a method of forming the sheath are provided for the protection of electrical cables or conduits from the temperatures attainable from an open flame comprising at least one sheet of substantially inorganic intumescent fire protective material of a generally rectangular configuration. The sheet has opposite major surfaces bound by four edge surfaces. It can be arranged around the electrical cable or conduit to abut one pair of opposite edge surfaces to form a protective layer. Means are provided for restraining the layer arranged around the electrical cable or conduit so that the layer can expand essentially only in the inward direction, i.e., generally towards the electrical cable or conduit. Cracking of the layer of intumescent material is thereby prevented.

Upon expansion, the fire protective sheath serves as a thermal insulator to protect the electrical cables or wires inside a conduit from melting and causing a short-circuit power failure. The fire protective sheath, in its unexpanded form, permits dissipation of heat generated in the cables themselves in normal use, due in part to the fin-like shape of the sheath. Thus, the fire protective sheet serves two functions. First it dissipates cable-generated heat in normal use. Second, it provides high temperature thermal insulation when exposed to fire temperatures.

BRIEF DESCRIPTION OF THE DRAWINGS

Other advantages of the invention will become apparent from the following drawings wherein like numerals refer to like parts, the accompanying description and the appended claims.

DETAILED DESCRIPTION

Figures 2A, 2B:
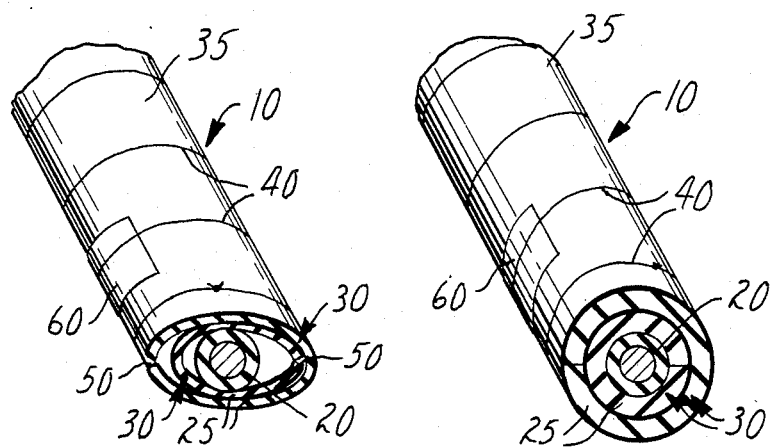
FIG. 2A is a fragmentary, perspective view of multiple sheets of FIG. 1 formed into layers to make the fire protective sheath of the present invention.
FIG. 2B is a view of the sheath of FIG. 2A after exposure to an open flame.

Referring now to the figures, there is shown an intumescent fire protective sheath 10 comprising at least one layer of generally rectangular-shaped intumescent material 25 arranged around a conduit 20. The intumescent material 25 is preferably made according to the teachings of U.S. Pat. Nos. 3,916,057 or 4,305,992, which are incorporated by reference, with the addition of a metal foil backing 35. The backing 35 is adhered to the material 25 by a pressure sensitive adhesive, not shown, as well known in the art. A suitable material for the backing 35 is aluminum foil. The individual sheets 30 of intumescent material 25 are preferably held in position by being over wrapped with ceramic fiber cordage, wire cloth or other high temperature resistant material 40. The over wrapping material 40 acts to restrain the sheath 10 especially when the sheath 10 is subjected to heat and the individual sheets 30 of intumescent material 25 are expanded as will be explained. A suitable ceramic fiber cordage can be made from the fibers described in U.S. Pat. Nos. 3,709,706 and 3,795,524 and 4,047,965 which are incorporated by reference.

Figures 3A, 3B:
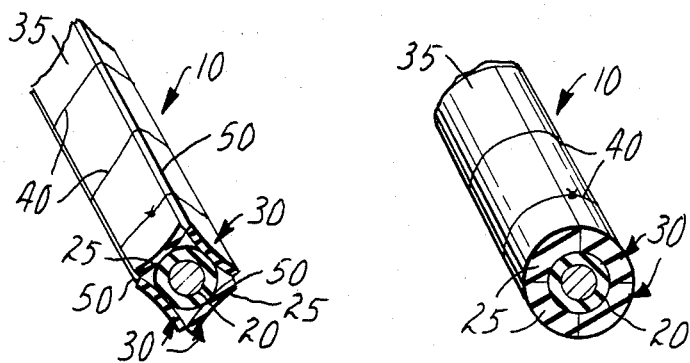
FIG. 3A is a fragmentary, perspective view of an alternative embodiment of the fire protective sheath of the present invention.
FIG. 3B is a view of the sheath of FIG. 3A after exposure to an open flame.
Figure 1:
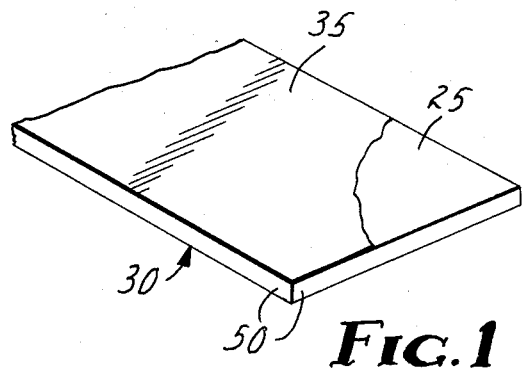
FIG. 1 is a fragmentary, perspective view of a sheet of the fire protective sheath of the present invention.

In the sheath 10, the intumescent sheets 30 expand only in the thickness direction when heated as well known due to the alignment of the components of the intumescent material. Since the outside perimeter length of the individual layers formed by the sheets 30 remains about the same, the material 25 expands only inwardly around the conduit or cable 20. As a result, surface stresses are not increased, and cracks in the sheets 30 are eliminated. The restraining material 40 is spirally wrapped at about 5 cm intervals about the sheath to restrain and hold the expanded sheath 10 as shown in FIGS. 2B and 3B. With the sheath 10 shown and described, the intumescent material 25 can achieve its full expansion without cracking and provide maximum thermal insulation and therefore protection from open fire.

The protective sheath 10 of the present invention allows the intumescent material 25 to expand inwardly in the range of two to four times its original thickness depending upon the composition of the material 25 chosen, the perimeter length of the individual layers of sheets 30, as viewed looking into an end of the conduit 20, and the temperature of the heated environment experienced by each layer. The perimeter length of the innermost layer is preferably determined by the following formula:

$$L = P(D + 5T),$$

where
L = the perimeter length of the innermost layer,
P = pi or 3.14159,
D = outside diameter of the conduit or cable 20, and
T = the unexpanded average thickness of the sheet 30.

The innermost layer can be comprised of many individual sheets 30 as exemplified by the embodiment of the invention shown in FIG. 3A where four individual sheets 30 comprise one layer. Similarly, if there is more than one layer of sheets 30, the perimeter length of each successive layer is determined by the same formula where D is determined by dividing the perimeter length of the adjacent inner layer by 3.14159. The successive layers can also comprise multiple, individual sheets 30.

If the perimeter length of each layer is substantially shorter than the preferred length as determined by the foregoing formula, the material 25 will be unduly constrained by the conduit 20 from fully expanding and providing the maximum thermal protection otherwise possible. If the perimeter length of each layer is substantially longer than the preferred length, the material 25 will be wasted and will add unnecessary weight to the sheathed conduit or cable 20.

In the present invention, the protective sheath 10 allows relatively good heat dissipation of cable-generated heat prior to exposure to flame temperatures. This is in part because the unexpanded material 25 is much denser and exhibits a much higher thermal conductivity value than the expanded form of material 25. This allows greater dissipation of resistive heat losses generated within the cable or conduit 20 in normal use. Also, the unexpanded material 25 is considerably thinner than the expanded material 25 and allows for more heat dissipation as well. In addition, the fin-shaped edges 50 provide additional surface area from which to dissipate the internally generated heat as shown in FIGS. 2A and 3A.

In use, the protective sheath 10 is applied to the conduit 20 by aligning the longer edges 50 of the sheets 30 along the length of the elongate conduit 20 and by loosely wrapping the individual sheets 30 around the underlying conduit 20 to abut the adjacent edges 50. The individual sheets 30 can be temporarily held in position prior to wrapping with restraining material with an adhesive backed tape 60 as shown in FIGS. 2A and 2B. In addition to the tape 60, other suitable temporary holding means can include staples, stitching or other mechanical fastening. Once the sheets 30 are positioned around the conduit 20 and held in position by the tape 60, the sheath 10 is completed by over wrapping with restraining material 40 as already described.

The invention is exemplified by the following non-limiting example and test.

A three meter long by 10.1 cm diameter heavy wall conduit was subjected to an ANSI/ASTM E-119-78 fire for a period of one hour. The conduit was protected by three layers of 4.9 mm thick sheets of "Interam" brand material available from Minnesota Mining and Manufacturing Company, 3M Center, St. Paul, Minn. 55144 in a two-piece, fin-shaped structure. The sheath was made by laminating 22.8, 27.3 and 30.5 cm sheets together to form one-half of the three-layer sheath. A second, one-half of the sheath was similarly laminated, and the two halves were arranged about the conduit to form the sheath having an inner layer of 45.6 cm perimeter length, an intermediate layer of 54.6 cm perimeter length and an outside layer of 61.0 cm perimeter length. The length of conduit protected was about 2.6 meters. The two-piece, three layered structure was restrained by spirally wrapping the outside surface with "Nextel" brand ¾ ceramic fiber cordage available from Minnesota Mining and Manufacturing Company. The spiral wrap spacing was about 5 cm. The results of the one hour fire test are shown in Table I.

TABLE I

| Time Minutes | E-119-78 Reference Temp. | *Actual Ambient Temp. | Average Conduit Surface Temp. |
|---|---|---|---|
| 5 | 538° C. | — | — |
| 10 | 704 | 681° C. | 34° C. |
| 15 | 759 | 764 | 52 |
| 20 | 794 | 799 | 72 |
| 25 | 821 | 845 | 104 |
| 30 | 843 | 832 | 156 |
| 35 | 862 | 833 | 197 |
| 40 | 878 | 895 | 238 |
| 45 | 892 | 886 | 279 |
| 50 | 905 | 894 | 319 |
| 55 | 916 | 913 | 356 |

TABLE I-continued

| Time Minutes | E-119-78 Reference Temp. | Actual Ambient Temp. | Average Conduit Surface Temp. |
|---|---|---|---|
| 60 | 927 | 928 | 382 |

After 60 minutes the average conduit surface temperature was measured at 382° C. and the cables were functional.

A second test was performed to compare the protective sheath of the present invention with a cylindrical wrap construction. By a cylindrical wrap it is meant the entire outside surface of the conduit was contacted with the wrap, and no appreciable air spaces existed between the conduit and the wrap or between the individual layers of the wrap. In other words, the wrap could only expand outwardly from the electrical conduit, rather than inwardly. The sheath of the present invention and the cylindrical wrap each comprised two layers of 6.0 mm thick sheets of Interam brand material over wrapped, as before, with Nextel brand cordage. The following data was generated.

TABLE II

| Structure | Time Minutes | Average Conduit Surface Temp. | Air Temp. Within Conduit |
|---|---|---|---|
| Sheath | 60 | 377° C. | 326° C. |
| Standard | 60 | 486° C. | 403° C. |

In the case of the cylindrical wrap, the cordage broke under the pressure of the expanding intumescent material, and the cylindrical wrap cracked. The sheath did not crack nor did the cordage break. This is evidenced by the conduit surface temperatures and the air temperatures attained within the respective conduits as shown above.

As shown and described, the intumescent fire protective sheath of the present invention provides superior protection of electrical cables and conduits from the attendant heat associated with open flames and the like. It is extremely light weight and easy to apply. It allows relatively good dissipation of cable-generated heat in normal use, and it protects the underlying cable or conduit from excessive temperatures in case of an accidental fire. Because of its relatively low organic content, it does not fuel any fire accidently caused.

Various modifications may be made by one skilled in the art without departing form the spirit of the invention as expressed in the accompanying claims. Therefore, all matter shown and described is to be interpreted as illustrative and not in a limiting sense.

I claim:

1. An intumescent fire protective sheath for the protection of an electrical cable or conduit from the temperatures attainable from an open flame comprising:
   a. at least one sheet of substantially inorganic intumescent fire protective material of a generally rectangular configuration having opposite major surfaces bound by four edge surfaces and capable of expansion generally only normal to the major surfaces, said sheet being loosely arranged around an electrical cable or conduit to abut adjacent edge surfaces and to form a generally fin-shaped protective layer spaced at least in part a distance from the electrical cable or conduit to permit dissipation of heat generated from within the electrical cable or conduit; and
   b. high temperature resistant means for restraining the layer around the electrical cable or conduit, whereby the layer can essentially expand only generally inwardly towards the electrical cable or conduit and in the range of 2–4 times the average height of the edge surfaces so that cracking of the layer upon expansion is virtually eliminated.

2. The intumescent fire protective sheath recited in claim 1 wherein (1) the electrical cable or conduit is substantially cylindrical in shape and (2) a perimeter length of the layer measured from one edge surface to an abutted edge surface is about equal to 3.14159 times the sum of the outside diameter of the electrical cable or conduit and 5 times the average height of the edge surfaces.

3. The intumescent fire protection sheath recited in claim 2 further comprising at least a second sheet of substantially inorganic intumescent fire protective material of a generally rectangular configuration having (1) opposite major surfaces bound by four edge surfaces and capable of arrangement around the first layer to abut adjacent edge surfaces of the second sheet and to form a second protective layer between the first layer and the layer restraining means and (2) a perimeter length measured from one edge surface of the second sheet to an abutted edge surface of the second sheet about equal to the sum of perimeter length of the first layer and 3.14159 times five times the average height of the edge surfaces of the second sheet.

4. The intumescent fire protective sheath recited in claim 3 wherein the means for restraining the layer around the electrical cable or conduit comprises ceramic fiber cordage.

5. The intumescent fire protective sheath recited in claim 4 further comprising means for holding the layers around the electrical cable or conduit before the layers are restrained by the ceramic fiber cordage.

6. The intumescent fire protective sheath recited in claim 5 wherein the holding means comprises adhesive-backed tape.

7. The intumescent fire protective sheath recited in claim 6 further comprising a metal foil backing adhered to the major surface of each of the sheets opposite the electrical cable or conduit when the sheath is arranged around the electrical cable or conduit to form the layers.

8. The intumescent fire protective sheath recited in claim 7 wherein said fin-shaped protective layer is generally eye-shaped.

9. The intumescent fire protective sheath recited in claim 7 wherein said fin-shaped protective layer is generally diamond shaped.

10. A method of forming a fire protective sheath around an electrical cable or conduit comprising the steps of:
   a. providing at least one sheet of substantially inorganic intumescent fire protective material of a generally rectangular configuration having opposite major surfaces bound by four edge surfaces and capable of expansion generally only normal to the major surfaces;
   b. loosely arranging the sheet around the electrical cable or conduit and abutting adjacent edge surfaces to form a fin-shaped protective layer spaced at least in part a distance from the electrical cable or conduit to permit dissipation of heat generated from within the electrical cable or conduit; and c. restraining the layer around the electrical cable or conduit with a high temperature resistant material, whereby the layer can expand generally only inwardly towards the electrical cable or conduit and in the range of 2-4 times the average height of the edge surfaces so that cracking of the layer upon expansion is virtually eliminated.

11. The method recited in claim 10 wherein said fin-shaped protective layer is generally eye shaped.

12. The method recited in claim 10 wherein said fin-shaped protective layer is generally diamond shaped.

* * * * *